June 21, 1966
W. D. LANIER ETAL
3,256,988
COALESCING FILTER
Filed Feb. 12, 1963
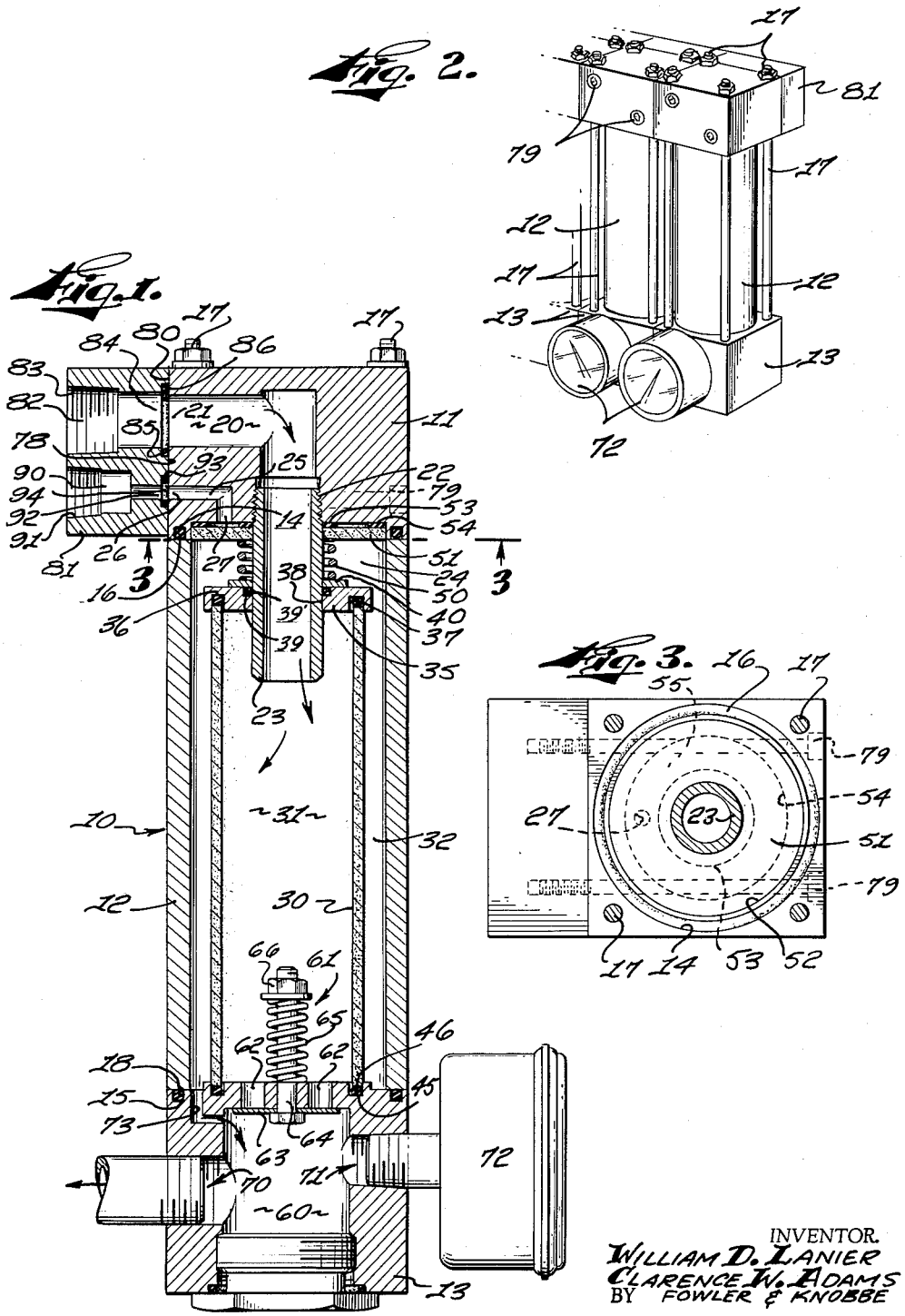
INVENTOR.
WILLIAM D. LANIER
CLARENCE W. ADAMS
BY FOWLER & KNOBBE
ATTORNEYS

United States Patent Office 3,256,988
Patented June 21, 1966

3,256,988
COALESCING FILTER
William D. Lanier, Fullerton, and Clarence W. Adams, Orange, Calif., assignors to Beckman Instruments, Inc., a corporation of California
Filed Feb. 12, 1963, Ser. No. 257,990
18 Claims. (Cl. 210—130)

The present invention relates to an improved coalescing filter and, more particularly, to such a filter particularly designed for use in process analytical instrumentation.

Sampling systems for liquid streams preferentially incorporate means for removing entrained water from these streams since an inaccurate analysis often results when water is injected into the analytical instrumentation. For example, the inclusion of water causes a shift in the base line of chromatography instruments. It is also desirable that the filter entrap all particles which can cause physical damage to the instrumentation. It is necessary, however, that the filter have a minimum affect upon the transport time of the liquid sample stream. Otherwise, the speed of response of the instrumentation system will be proportionately decreased. Another requirement is that the filter be readily dismantled for cleaning while being of relatively simple and economical construction. A still further requirement is that the filter element have a long life. It is the primary object and purpose of this invention to provide a coalescing filter which satisfactorily fulfills each of these requirements.

In accordance with a preferred form of the present invention, there is provided a coalescing filter which allows a substantial portion of the liquid stream to bypass the filter element while maintaining proper flow of the filtered sample liquid. Briefly, the filter comprises a cylindrical coalescing filiter element vertically disposed within a hollow cylindrical cavity forming thereby a first cylindrical chamber within the filter element and a second annular chamber between the outer wall of the filter and the interior wall of the cavity. An inlet port is located at the top of the first chamber and a check valve is located at the bottom thereof in communication with still a third chamber. This latter chamber is in communication with a bypass outlet port. A bleed passage connects the second and third chambers.

The check valve is preset to provide a pressure drop thereacross greater than the pressure drop across the filter element. The pressure in the second chamber is then greater than in the third chamber and, as a result, the water passing through the filter coalesces and forms water drops on the downstream surface of the filter, i.e. on the surface within the second chamber. This water, being denser than the sample, is caused to flow from the second chamber into the third chamber via the bleed passage and thence out the bypass outlet. The sample liquid stripped of free water rises in the second chamber and passes out a sample outlet provided at the top thereof.

Filters constructed in the manner described above and in more detail hereinafter permit a large flow of liquid through the filter element whereby the filter causes only minimal transport lag time of the liquid stream. Also, the flow of liquid stream from the top to bottom of the filter element scrubs the element and thus prolongs the filter element life.

A more thorough understanding of the invention may be obtained by a study of the following detailed description taken in connection with the accompanying drawing in which:

FIG. 1 is a vertical cross-sectional view taken through a coalescing filter constructed in accordance with this invention;

FIG. 2 is a perspective view of an assembly of plural filter elements of the invention showing their external construction and mounting as a module unit;

FIG. 3 is a cross-sectional view taken along the line 3—3 of FIG. 1.

Referring now to FIGS. 1 and 2, the external portion of filter 10 comprises a cap member 11, a cylindrical center member 12 and a base member 13. The cap and base members are preferably rectangular in shape thereby permitting a plurality of filters to be mounted in abutting relationship so as to form a module unit (FIG. 2).

The bottom face of the cap member and the upper face of the base member include respective annular grooves 14, 15 in which are retained respective resilient sealing O rings 16, 18 for providing a fluid-tight seal between the respective ends of the center member 12 and the cap and base members 11, 13. Four bolts 17 retain these members in position.

Cap member 11 includes an inlet channel 20 having an external port 21 at one end and an internally threaded cylindrical fitting 22 at the other end thereof. A pipe 23 threadedly engages this fitting and extends vertically downward within the cylindrical cavity 24 formed by the center member 12. Cap 11 further includes a sample outlet channel having an external port 26 and an internal port 27 at opposite ends thereof.

The coalescing filter element 30 is cylindrical in shape and is vertically mounted within cylindrical cavity 24 so as to define a first chamber 31 within the filter element and a second annular chamber 32 between the outer wall of the filter 30 and the interior wall of the cavity. This filter is preferably formed of an inert permeable material which is capable of coalescing the water dispersed in the inlet stream. Sintered stainless steel is a preferred filter material and is available for removing particles as fine as five microns in diameter.

The filiter element is covered at the top by a cylindrical cover 35 having an annular groove 36 in its bottom face in which is retained a resilient "O" ring seal 37 and the upper edge of the filter element. Cover 35 further includes a circular opening 38 through which pipe 23 extends into the first chamber 31. A fluid tight seal is formed between this opening and the pipe by an annular groove 39 circumscribing opening 38 and retaining a resilient "O" ring 39'. This ring is held in place by a metal washer 40. The bottom of the filter element is retained in an annular groove 45 formed in the top surface of the base member 13 with an O ring 46 located in this groove between the filter and base for providing a fluid seal therebetween. The filter element 30 is retained in a fixed position within the central member 12 by a compression spring 50 which engages at opposite ends the washer 40 and the underside of a guard filter element 51.

Guard filter 51 is also preferably formed of sintered stainless steel and is positioned in a shallow cylindrical chamber 52 formed in the bottom face of the cap member 11. A pair of thin concentric gaskets 53, 54 formed of a material such as polytetrafluoroethylene located between the upper surface of the filter element 51 and the bottom surface of the chamber 52 (FIG. 3). Gasket 53 provides a fluid tight seal between the chamber 32 and the outer periphery of the filter element 51 and washer 54 provides a fluid tight seal between the pipe 23 and the cylindrical opening in the filter 51. The space 55 between the larger diameter gasket 53 and the smaller diameter washer 54 provides an annular chamber for the liquid flowing from the second chamber 32 through the guard filter 51 into the sample outlet port 27.

The base member 13 includes an interior cavity forming a third chamber 60 connected to the bottom of the second chamber 31 by a check valve 61. This valve comprises a plurality of orifices 62 covered by a washer 63 which is retained in position by a bolt 64, compression spring 65 and nut 66. This valve will maintain a predetermined pressure drop between the second and third chambers because of the fluid pressure required to force the washer 63 downward against the force supplied by the compression spring. This pressure may be varied by rotating nut 66 so as to change the compression force of spring 65.

The base member 60 further includes a threaded by-pass outlet 70, a threaded gage fitting 71 in communication with a pressure gage 72 and a bleed passage 73 interconnecting the second chamber 32 and third chamber 60.

An advantage of this invention is that no pipe or tubing fittings have to be dismantled to remove the filter element for cleaning. This is accomplished by providing the port side of the cap member 11 with a flat plane or face 80 fixedly retained to a planar face 78 of an adapter block 81 by bolt 79. This latter member has a through bore 82 having an internally threaded cylindrical fitting 83 at one end for engagement with the pipe, tubing or other conduit conducting a liquid stream and a port 84 at the other end juxtaposed the inlet port 21 of cap member 11. Annular groove 85 circumscribes port 84 and retains an elastic sealing O-ring 86. Adapter block 81 further incorporates through bore 90 having an internally threaded fitting 91 at one end for engagement with the pipe or tubing leading to the analytical instrument and a diametrically decreased port 92 at the other end juxtaposed the sample outlet port 26. An annular groove 93 circumscribes port 92 and retains an elastic sealing O-ring 94. This construction permits easy disassembly of the cap and center members for facilitating removal of the filter elements while insuring a secure and liquid tight connection with the inlet and sample outlet fluid paths.

The operation of the filter described hereinabove is as follows: a portion of the inlet stream passes through the coalescing filter element. The water passing through the filter coalesces and forms water drops on the downstream or outside surface of the filter element. As long as the density of the water is greater than that of the sample liquid, the water will drop to the bottom of the second chamber 32 whereas the filtered liquid will rise in the chamber. The water and excess filtered sample in chamber 32 is forced to flow through the bleed passageway 73 into the third chamber by means of a pressure maintained in the second chamber by check valve 61. This valve is set to provide a pressure drop between the first chamber 31 and the third chamber 60 somewhat greater than the pressure drop across the filter element 30. The pressure in the second chamber 32 is thereby maintained greater than the pressure in the third chamber 60. The pressure in chamber 32 further causes the filtered sample liquid to flow through the guard filter 51 and out the sample outlet port 26. That portion of the inlet stream which is not passed through the filter 10 passes through check valve 61 into the third chamber 60. The unfiltered sample, water and excess sample from the bleed passage 73, pass out of the filter element via by-pass outlet 70.

Filter 30 serves to remove both water and particles from the inlet liquid stream. Guard filter 51 further insures that particles are entrapped within the filter element. Thus, if the filter element 30 would ever become substantially clogged due to improper maintenance so that the flow therethrough were sharply diminished, some unfiltered liquid could be forced from the third chamber through bleed passage 73 into the second chamber 32. Guard filter 51 would then serve to entrap particles proir to their being carried to the analytical test instrument. Although water will be transmitted to the instrument under such circumstances, this normally has no deleterious effect upon the instrument but only decreases the accuracy of the analytical measurement as noted hereinabove.

Filters constructed in the manner described permit a large flow of liquid through the filter element with only a minimal time delay while providing an adequate supply of sample liquid from which both water and particles have been removed. Filters constructed according to the teachings of the invention are capable of removing all of the free water in the liquid stream when substantial percentages of water are contained therein, e.g., when the liquid stream contains as high as 25% to 50% water. Furthermore, the unit is capable of removing all particles having a size greater than 5 microns. Another advantage of the invention is that the filter element is inherently prolonged by the self-cleaning action provided by the flow of the liquid stream from top to bottom within the filter element which serves to scrub the element.

Although an exemplary embodiment has been disclosed and discussed, it will be understood that other applications of the invention are possible and that the embodiment disclosed may be subjected to various changes, modifications and substitutions without necessarily departing from the spirit of the invention.

We claim:
1. A coalescing by-pass filter comprising
 a housing having a generally cylindrical interior portion and an inlet and sample outlet port thereto;
 a generally cylindrical coalescing filter element retained within said cylindrical interior portion of said housing, said filter being diametrically smaller than said cylindrical interior portion;
 means connecting said inlet port to one end of said filter element so that all of the fluid flowing out of said inlet port enters the interior of said filter element;
 valve means connecting the other end of said filter to another chamber of said housing;
 means connecting said last named chamber to a by-pass outlet; and
 a bleed passage connecting said last named chamber to the bottom of said cylindrical interior portion at a point outside the outer wall of said filter element.

2. A coalescing bypass filter including
 a coalescing filter element,
 a housing having formed therein a hollow cavity in which said coalescing filter element is disposed, a first chamber being formed within the filter element and a second chamber being formed between the outer wall of said filter element and the interior wall of said housing,
  said housing including an inlet port in communication with the upper portion of said first chamber, a sample outlet port in communication with the upper portion of said second chamber, and a third chamber below said hollow cavity in communcation with a bypass outlet port;
 bleed passage means connecting said second and third chambers; and
 valve means connecting said first and third chambers responsive to a differential pressure greater than the differential pressure across said filter element so that the pressure in said second chamber is maintained at a higher value than the pressure in said third chamber,
  said greater differential pressure causing
   (1) the water and excess sample to flow out of said second chamber through said bleed passage means into said third chamber and out the bypass outlet thereof and
   (2) said sample stripped of water to flow out said sample outlet port.

3. The coalescing bypass filter defined in claim 2 wherein
 said housing comprises an upper member having an external planar face and openings extending inwardly therefrom respectively communicating with the inlet port and sample outlet port.

4. The coalescing bypass filter defined in claim 3 which comprises
 an adapter member having a pair of liquid passages, means for connecting said passages to a liquid stream conduit and to a sample outlet conduit,
 said adapter member having a planar face including openings communicating respectively with said passages and extending inwardly from said planar face, said openings being located so as to be juxtaposed the openings in the planar face of said upper member; and
means for sealing said openings including an annular groove circumscribing each of said openings in one of said planar faces and O ring seals retained therein.

5. The coalescing filter element defined in claim 2 wherein
said housing comprises a cap member, a cylindrical center member, and a base member;
means for sealing the joints between said members comprising an annular groove on the bottom and top respectively of said cap and base members and O seals respectively retained in said grooves and disposed between said cap and central members and between said base and central members.

6. The coalescing bypass filter defined in claim 2 wherein
said filter element comprises a cylindrical member formed of an inert permeable material adapted for coalescing water dispersed in a liquid stream,
means for retaining said filter within said housing cavity comprising an annular groove in the bottom of said cavity and an O seal retained within said groove and disposed between the bottom of said filter and said cavity,
 a cover member having an annular groove and an O ring seal retained therein disposed between the top of said filter and the top of said annular groove, and
 means including a compression spring located between said cover and said housing for fixedly retaining said filter element therewithin.

7. The coalescing filter defined in claim 6 wherein said inlet port includes a vertical pipe extending through a circular opening of said cover member into the interior of said filter element.

8. The coalescing bypass filter defined in claim 7 comprising
sealing means between said pipe and said cover member comprising an annular groove in said cap member circumscribing said circular opening and an O ring seal retained therein.

9. The coalescing bypass filter defined in claim 2 which comprises
a guard filter covering said sample outlet port.

10. The coalescing bypass filter defined in claim 9 wherein
said guard filter comprises an annular disc of filter material and a pair of thin concentric sealing gaskets located between said filter disc and the top of said cavity, the outside diameter of the smaller of said gaskets being smaller than the inside diameter of the larger thereof thereby forming an annular chamber communicating with said sample outlet port.

11. The coalescing bypass filter defined in claim 10 wherein
said housing cavity is in the form of a vertically extending cylinder and wherein said smaller washer seals between the guard filter disc and said inlet port and said larger washer sealing between the guard filter disc and the wall of said cavity.

12. The coalescing bypass filter defined in claim 2 wherein
said valve comprises a plurality of openings between said first and third chambers covered by a spring biased cover.

13. The coalescing bypass filter defined in claim 12 including
means for changing the compression of said spring for varying the pressure drop across said valve.

14. The coalescing bypass filter defined in claim 2 wherein
said filter element is formed of sintered stainless steel.

15. The coalescing bypass filter defined in claim 2 wherein said housing comprises
a generally rectangular cap member,
a generally cylindrical center member, and
a generally rectangular base member
 whereby a plurality of said filters may be abutted to form a module unit.

16. The coalescing bypass filter defined in claim 2 wherein is provided a flow of liquid from the top to bottom of said filter element, said liquid flow serving to scrub the element and thereby prolong the filter element life.

17. A coalescing bypass filter comprising
a cap member having an external planar face and first and second openings extending inwardly from said planar face respectively communicating with an inlet port and sample outlet port located on the bottom surface of said member,
a base member having a cavity formed therein and a bypass outlet port in communication with said cavity,
a cylindrical center member fixably mounted in fluid-tight connection between the bottom of said cap member and the top of said base member;
a cylindrical filter element retained within said cylindrical center member, said filter element having its bottom surface sealed against the upper surface of said base member and its upper side enclosed by a cover member,
a pipe extending downwardly from said inlet port in said cap member through said cover into the cavity formed by said cylindrical filter element,
 a first chamber in communication with said inlet port being thereby formed within the cylindrical filter element and
 a second chamber in communication with said sample outlet port being formed between the outer wall of said filter element and the interior wall of said cylindrical center member bleed passage means connecting said second chamber and said cavity in said base member;
valve means located between said first chamber and said cavity formed within said base member, said valve means being responsive to a differential pressure greater than the differential pressure across said filter element; and
means for releasably mounting said base member and cylindrical center member to said cap member so that said cap member may be quickly and easily dismantled from said cylindrical center member thereby facilitating replacement of said filter element.

18. The coalescing bypass filter defined in claim 17 which comprises
a disc shaped guard filter disposed in a shallow cylindrical chamber formed in the bottom surface of said cap member, said filter including a circular opening through which extends said pipe connected to said sample inlet port and including means for providing a fluid-tight seal between said pipe and said filter element and between the peripheral surface of said filter and said shallow cylindrical chamber so that all of the fluid flowing out of said sample outlet port first passes through said guard filter.

References Cited by the Examiner

UNITED STATES PATENTS

| | | | |
|---|---|---|---|
| 2,837,214 | 6/1958 | Kasten | 210—300 |
| 2,970,468 | 2/1961 | Price | 210—307 X |
| 3,019,904 | 2/1962 | Stecher | 210—422 X |

REUBEN FRIEDMAN, *Primary Examiner.*

F. SPEAR, *Assistant Examiner.*